US012662087B2

(12) United States Patent
Girodot et al.

(10) Patent No.: US 12,662,087 B2
(45) Date of Patent: Jun. 23, 2026

(54) TELESCOPIC CLEANING DEVICE, DETECTION SYSTEM AND METHOD FOR ASSEMBLING THE TELESCOPIC CLEANING DEVICE

(71) Applicant: VALEO SYSTEMES D'ESSUYAGE, La Verriere (FR)

(72) Inventors: Cyrille Girodot, La Verriere (FR); Loic Roussel, La Verriere (FR)

(73) Assignee: Valeo Systemes d'Essuyage, Bobigny (FR)

( * ) Notice: Subject to any disclaimer, the term of this patent is extended or adjusted under 35 U.S.C. 154(b) by 24 days.

(21) Appl. No.: 18/564,989

(22) PCT Filed: May 25, 2022

(86) PCT No.: PCT/EP2022/064299
§ 371 (c)(1),
(2) Date: Nov. 28, 2023

(87) PCT Pub. No.: WO2022/253686
PCT Pub. Date: Dec. 8, 2022

(65) Prior Publication Data
US 2024/0286582 A1 Aug. 29, 2024

(30) Foreign Application Priority Data

May 29, 2021 (FR) ...................................... 2105635

(51) Int. Cl.
*B60S 1/56* (2006.01)
*B05B 15/70* (2018.01)
(Continued)

(52) U.S. Cl.
CPC ................ *B60S 1/56* (2013.01); *B05B 15/70* (2018.02); *B60S 1/528* (2013.01); *B60S 1/48* (2013.01); *G01S 2007/4977* (2013.01)

(58) Field of Classification Search
None
See application file for complete search history.

(56) References Cited

U.S. PATENT DOCUMENTS 9,992,388 B2 6/2018 Romack et al.
10,988,118 B2 4/2021 Picot et al.
(Continued)

FOREIGN PATENT DOCUMENTS

CN 109923007 A 6/2019
DE 102008012485 B4 * 5/2015 ............. B60S 1/528
(Continued)

OTHER PUBLICATIONS

European Patent Office, International Search Report (with English translation) and Written Opinion of corresponding International Application No. PCT/EP2022/064299, dated Aug. 30, 2022.
(Continued)

*Primary Examiner* — Omair Chaudhri
(74) *Attorney, Agent, or Firm* — Valeo Systemes d'Essuyage

(57) ABSTRACT

A telescopic cleaning device for an optical sensor of a vehicle, including a support sheath, a sprayer body, a sprayer adapted to be movable in translation relative to the sprayer body, with the sprayer body being adapted to be inserted in translation into the sheath and adapted to be attached in the sheath by blocking means. The sprayer body is thus prevented from coming out of the sheath, allowing secure attachment of the sprayer body in a vehicle. The invention also relates to a detection system and a method for assembling the telescopic cleaning device.

7 Claims, 2 Drawing Sheets

(51) Int. Cl.
    *B60S 1/48*         (2006.01)
    *B60S 1/52*         (2006.01)
    *G01S 7/497*      (2006.01)

(56)            References Cited

U.S. PATENT DOCUMENTS

| | | | |
|---|---|---|---|
| 11,305,737 B2 | 4/2022 | Baudouin et al. | |
| 2003/0116645 A1* | 6/2003 | Hirose | B60S 1/528 |
| | | | 239/284.2 |
| 2015/0078940 A1* | 3/2015 | Kikuta | F04B 17/03 |
| | | | 417/443 |
| 2016/0339875 A1* | 11/2016 | Ina | B60S 1/522 |
| 2019/0225194 A1* | 7/2019 | Baudouin | B08B 3/04 |
| 2021/0088668 A1 | 3/2021 | Hahn et al. | |

FOREIGN PATENT DOCUMENTS

| | | | |
|---|---|---|---|
| EP | 3418134 A2 | 12/2018 |
| FR | 3056525 A1 | 3/2018 |
| JP | 2016222074 A | 12/2016 |

OTHER PUBLICATIONS

China Patent Office, First office action dated Mar. 20, 2026 regarding the Chinese patent application No. 202280038569.X along with an English translation (12 pages).

\* cited by examiner

TELESCOPIC CLEANING DEVICE, DETECTION SYSTEM AND METHOD FOR ASSEMBLING THE TELESCOPIC CLEANING DEVICE

TECHNICAL FIELD

The invention relates to a telescopic cleaning device, a detection system and a method for assembling the telescopic cleaning device.

BACKGROUND OF THE INVENTION

Optical position sensors, which are now fitted in a great many motor vehicles, have the function of collecting information on the area surrounding the vehicle, in particular to assist the driver in driving and/or maneuvering this vehicle. To this end, an optical sensor is commonly installed on the vehicle so as to collect information on the area surrounding the vehicle such as the area to the front and/or rear of the vehicle: the detection system is therefore for example installed at the front end and/or at the rear end.

However, such locations are particularly exposed to dirt such as dirty water, dust or other types of spray. This dirt constitutes an obstacle to the transmission and reception of information and can disrupt the operation of the optical sensor, or even make operation impossible.

It has been proposed to use a telescopic cleaning device to clean the optical sensors to rid them of this dirt.

However, there is then the problem of attaching such a telescopic cleaning device and especially breakage of the attachment members, which are subject to vibration that weakens them.

There is a need to more securely attach a device for cleaning an optical sensor of a vehicle.

SUMMARY OF THE INVENTION

The aim of the invention is to provide a device for cleaning an optical sensor of a vehicle allowing secure attachment.

To this end, the invention proposes a telescopic cleaning device for an optical sensor of a vehicle, comprising a support sheath, a sprayer body, a sprayer adapted to be movable in translation relative to the sprayer body, the sprayer body being adapted to be inserted in translation into the sheath and adapted to be attached in the sheath by blocking means.

According to one variant, the blocking means form the blocking in translation of the sprayer body relative to the sheath.

According to one variant, the blocking means form the blocking in translation by elastic nesting of the sprayer body in the sheath.

According to one variant, the translation blocking means comprise tabs on the sprayer body or on the sheath nesting elastically with projections on the other of the sprayer body or of the sheath.

According to one variant, the blocking means form the blocking in rotation of the sprayer body relative to the sheath.

According to one variant, the rotation blocking means comprise guide surfaces on one or other of the sprayer body or of the sheath interacting with at least one groove on the other of the sprayer body or of the sheath.

According to one variant, the guide surfaces are carried by guides protruding from the sprayer body, spaced apart along the length of the body, the guides interacting with the groove or grooves on the sheath on either side of the body.

According to one variant, the groove or grooves are frustoconical, the width of the groove or grooves decreasing toward the bottom of the sheath.

According to one variant, the sprayer includes a fluid dispensing bar.

The invention also relates to a detection system comprising an optical sensor of a vehicle and a telescopic cleaning device as described above, configured to clean the optical sensor.

The invention also relates to a method for assembling a telescopic cleaning de-vice as described above, comprising the insertion of the sprayer body into the sheath in a direction of translation of the sprayer toward the inside of the body, and the attachment of the sprayer body in the sheath by the blocking means.

According to one variant, the blocking means form the blocking in translation of the sprayer body relative to the sheath by elastic nesting of the sprayer body in the sheath.

According to one variant, the blocking means form the blocking in rotation of the sprayer body relative to the sheath, the rotation blocking means comprising guide surfaces on one or other of the sprayer body or of the sheath interacting with at least one groove on the other of the sprayer body or of the sheath.

All of the advantages of the device according to the invention are transposed mutatis mutandis to the detection system and to the method for assembly, and vice versa.

BRIEF DESCRIPTION OF THE DRAWINGS

Further features and advantages of the present invention will become apparent from reading the following detailed description, in order to understand which reference will be made to the appended figures, which show.

The drawings in the figures are not to scale. Similar elements are generally de-noted by similar references in the figures. In the context of this document, identical or analogous elements may bear the same references. Furthermore, the presence of reference numbers in the figures cannot be considered limiting, including when these numbers are included in the claims.

DETAILED DESCRIPTION OF THE INVENTION

The invention proposes a telescopic cleaning device comprising a support sheath, a sprayer body and a sprayer adapted to be movable in translation relative to the sprayer body. The sprayer body is adapted to be inserted in translation into the sheath and adapted to be attached in the sheath by blocking means. The sprayer body is thus prevented from coming out of the sheath, allowing secure attachment of the sprayer body (and the sprayer) in a vehicle. This type of attachment is therefore not subject to breakage owing to vibration.

Figure 1:
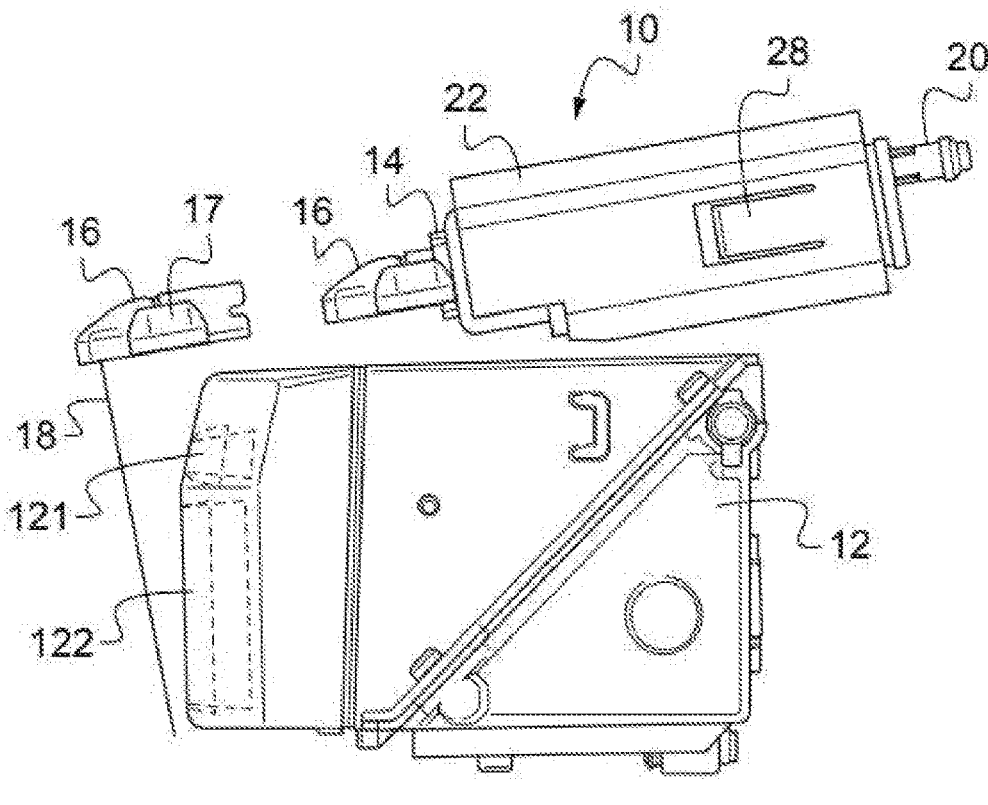
FIG. 1 is a view of an example of a cleaning device arranged near a vehicle position detection system.

FIG. 1 shows a view of an example of a cleaning device 10 arranged near an optical sensor 12 of a vehicle. The optical sensor 12 makes it possible to collect information on the position of and the area surrounding the motor vehicle, in particular to assist the driver in driving and/or maneuvering this vehicle. The optical sensor 12 is installed on the vehicle so as to collect information on the area to the front, rear and/or side of the vehicle: the optical sensor 12 is for example installed at the front end and/or at the rear end. The optical sensor 12 is for example a LI-DAR, this standing for "light detection and ranging" or "laser imaging, detection, and ranging". The optical sensor 12 has faces 121 and 122 through which information about the surrounding area is detected.

The device 10 comprises a sprayer body 14 and a sprayer 16 adapted to be movable in translation relative to the body 14. The sprayer 16 is movable in a plane. FIG. 1 shows the sprayer 16 in a retracted position inside the body 14 (right-hand position) and an extended position outside the body 14 (left-hand position). The device 10 is telescopic in the sense that the sprayer 16 moves in a direction of translation relative to the body 14 between these extended and retracted positions, in one direction or another. The sprayer 16 moves in this way in one direction toward the outside of the body 14 into the extended position and in the other direction toward the inside of the body 14 into the retracted position.

The device 10 allows cleaning of the faces 121, 122 of the optical sensor 12. In FIG. 1, when the sprayer moves into the extended position, the sprayer 16 can dispense jets 18 of cleaning liquid onto the faces 121, 122 by virtue of a fluid dispensing bar 17. The sprayer 16 and the bar 17 form a single part, which is a subassembly of two plastic parts injection molded and assembled by ultrasonic welding. The bar 17 has a shape of an arc of a circle such that it can send jets of water to all the faces 121, 122. Once a cleaning cycle is complete, the sprayer 16 moves toward the inside of the body into the retracted position. The device 10 is supplied with cleaning liquid via an intake 20 at one end of the body 14 opposite that occupied by the sprayer 16.

The device 10 further comprises a support sheath 22 attached in the area sur-rounding the optical sensor 12. The sheath 22 may be attached in the surrounding area by various means ensuring that it is held in position, in particular by resisting vibration. Preferably, the sheath 22 is attached by its upper surface in the area surrounding the optical sensor 12 so as not to be attached to the optical sensor 12. Moreover, as the area surrounding the optical sensor 12 is narrow, the use of the sheath 22 to support the body 14 makes it possible to define a way of attaching the sheath to the surrounding area which adapts to the narrowness of the surrounding area. Furthermore, the use of the sheath to attach the sprayer body makes it possible to reduce the spacing between the body 14 (and the sprayer) and the optical sensor 12; this allows the sprayer to be placed as close as possible to the optical sensor and save space. The body 14 is adapted to be inserted in translation into the sheath 22 and adapted to be attached in the sheath 22 by blocking means. The sheath 22 thus makes it possible to securely support the body 14 and the sprayer 16 in the area surrounding the optical sensor 12, without this attachment being subject to weakening and breakage as a result of the vibration generated by the vehicle.

Figure 2:
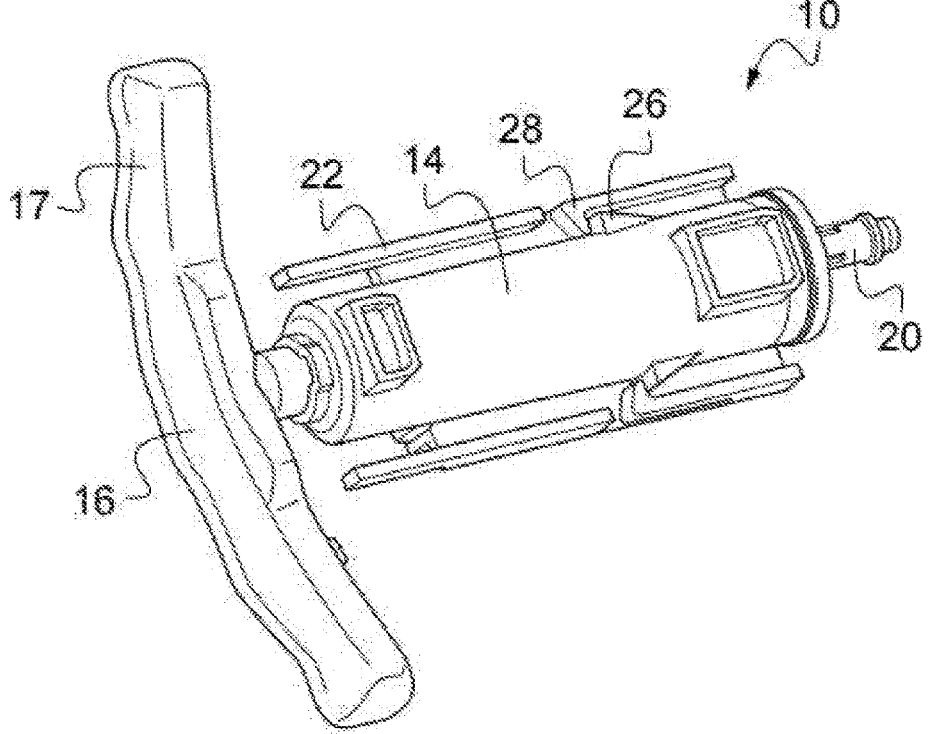
FIG. 2 is a perspective view of the device of FIG. 1.

FIG. 2 shows a perspective view of the device of FIG. 1. The body 14 is inserted in translation into the sheath 22 and is adapted to be attached in the sheath 22. The sprayer 16 is in the retracted position inside the body 14. FIG. 2 shows in particular the attachment of the body 14 in the sheath by blocking means. These means can ensure blocking in translation. The body 14 is blocked in translation in the sheath 22. According to one embodiment by way of example, the blocking means form an elastic nesting of the sprayer body 14 in the sheath 22. In other words, the blocking means form clips for attaching the body 14 in the sheath 22. Such elastic nesting has the advantage of being simple and resistant to vibration in the area surrounding the optical sensor 12 because the blocking means are in a stable position in the position in which they block the body 14 in the sheath 22. Such nesting also makes it possible to remove the body 14 from the sheath 22 for maintenance. This removal is not inopportune—for example due to vibration-because it is carried out using a tool.

Figure 3:
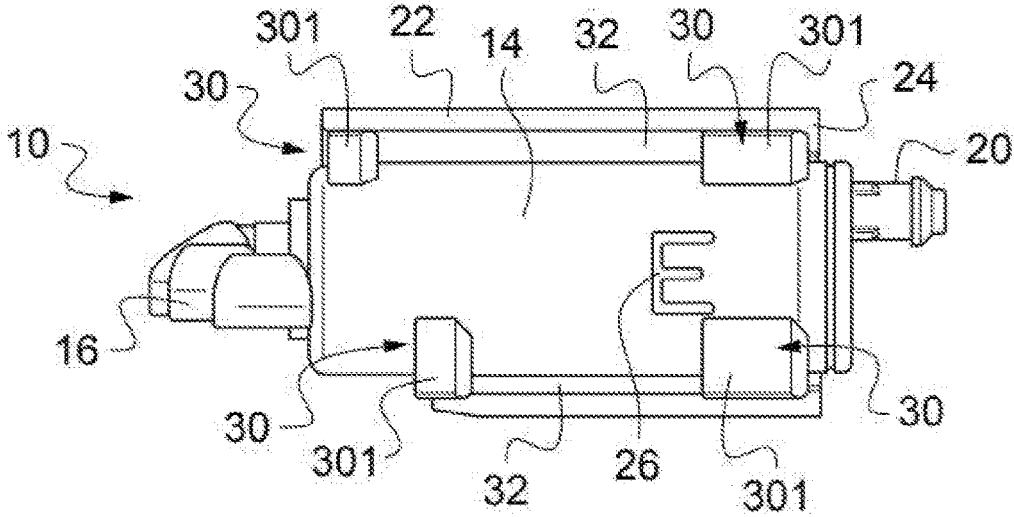
FIG. 3 is a profile view of the device of FIG. 1.

FIG. 2 shows an example of the translation blocking means forming elastic nesting. The translation blocking means may include tabs 28 (also visible in FIG. 1) on the body 14 or on the sheath 22 nesting elastically with projections 26 on the other of the body 14 or of the sheath 22. For easier manufacturing of the device 10, according to FIG. 2, the projections are carried by the body 14 and the tabs 28 are carried by the sheath 22. The projections 26 extend from the body 14 and are for example inclined planes moving out from the body in the direction of movement of the sprayer toward the outside of the body 14. The inclined planes are interrupted by a wall transverse to the body 14. The tabs 28 are for example cut-outs in the wall of the sheath 22. The tabs 28 are elongate and are elastically articulated via one of their ends to the sheath 22; at the other end, the tabs 28 include a hook engaging with the projections 26, and more specifically with the transverse walls of the inclined planes. Once the hooks of the tabs 28 engage with the projections 26, the body 14 is blocked in translation in the direction of translation of the sprayer 16 toward the outside of the body 14. The body 14 is blocked in the direction of extraction of the body 14 from the sheath 22. Such attachment is not subject to breakage because the tabs 28 are in a stable position and are therefore not stressed. The blocking means are not subject to breakage owing to the vibration of the vehicle. Moreover, as can be seen in FIG. 3, the blocking means also make it possible to block the body 14 in translation in the direction of translation of the sprayer 16 toward the inside of the body, the body 14 being in abutment against the bottom 24 of the sheath 22. Once the body 14 is in abutment against the bottom 24 of the sheath 22, the body 14 is blocked in translation in the direction of insertion of the body 14 into the sheath 22. Such blocking is also not subject to breakage owing to vibration and the attachment is therefore secure.

The translation blocking means may comprise one or more tabs 28 interacting with one or more respective projections 26; preferably, the device 10 comprises two pairs of tabs 28 and projections 26, located on either side of the body 14, preferably diametrically opposed about the body 14, to ensure the stability of the body 14 in the sheath 22.

Figure 4:
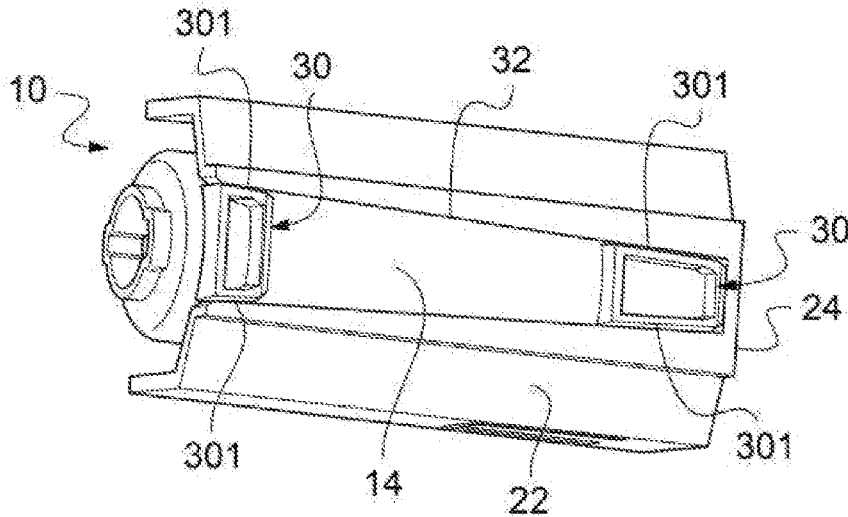
FIG. 4 is a perspective view of the device of FIG. 1.

FIGS. 3 and 4 show profile and perspective views of the device 10 of FIG. 1. In FIG. 3, the sprayer 16 is in the retracted position relative to the body 14. A projection 26 on the blocking means is shown. In FIG. 4, the sprayer 16 is not shown and the top of the sheath is shown transparently. In these figures, the body 14 is attached in the sheath 22 by the blocking means. These blocking means may also ensure blocking in rotation of the sprayer body 14 relative to the sheath 22. The blocking means make it possible to keep the sprayer body 14 and the sprayer 16 in position in the area surrounding the optical sensor 12 such that the sprayer 16 has the same angular orientation in the extended position so as to duly send the jets of water onto the faces 121, 122. Moreover, maintaining the same angular orientation of the sprayer 16 also allows it to move in translation in one direction or the other without rotating on itself and therefore without coming into abutment on another part in the area surrounding the optical sensor 12. The rotation blocking means are not subject to breakage owing to vibration, for ex-ample.

The combination of the translation and rotation blocking functions of the blocking means allows the sprayer body 14 to be held in position and the translational movements of the sprayer 16 to be repeated during cleaning cycles. This ensures good cleaning of the optical sensor over time. The body 14 is held in position despite vibration of the vehicle.

The rotation blocking means comprise for example guide surfaces 301 on one or other of the body 14 or of the sheath 22 and at least one groove 32 on the other of the body 14 or of the sheath 22 interacting with the guide surfaces 301. As mentioned below, the interaction between the surfaces 301 and the groove or grooves 32 not only makes it possible to block the body 14 (and the sprayer 16) in rotation in the sheath 22 but also to provide guidance during the assembly of the body 14 in the sheath 22.

According to the exemplary embodiment of FIGS. 3 and 4, the guide surfaces 301 are carried by guides 30 projecting from the body 14 spaced apart along the length of the body 14. The guides 30 penetrate into the groove or grooves 32 on the sheath 22 on either side of the body 14. The guides 30 are spaced apart along the length of the body 14 to prevent any twisting movement of the body 14 in the sheath 22. As per the figures, the guides 30 may for example be at the ends of the body 14 and/or be offset relative to one end; as shown in FIG. 1, this makes it possible to tilt the device 10 as close as possible to the optical sensor 12. The rotation blocking means may include two grooves 32 interacting with guide surfaces 301 on either side of the body 14 to ensure the blocking in rotation of the body 14 in the sheath 22. Thus, and as an example in the figures, the body 14 comprises four guides 30 supporting the guide surfaces 301, two guides 30 above the plane of mobility of the sprayer 16 and two guides 30 below the plane of mobility of the sprayer 16. This ensures good stability over time of the body 14 and the sprayer 16, in particular to withstand movement of the sprayer 16 and vibration of the vehicle. In FIG. 3, one pair of guides 30 above and below the plane are diametrically opposed. The other pair of guides 30 above and below the plane are offset from one another in the direction of movement of the sprayer.

As can be seen in FIGS. 3 and 4, the function of blocking in translation of the blocking means may be ensured by the guides 30 interacting with the bottom 24 of the sheath 22, allowing blocking in translation in the direction of translation of the sprayer 16 toward the inside of the body. One or preferably two guides 30 abut against the bottom 24 of the sheath 22. The guides 30 are for example of parallelepiped shape (or "box" shaped) with the side faces forming the guide sur-faces 301. The bottom 24 may be such that the end of the body 14 not bearing the sprayer 16 may extend beyond the sheath 22; the bottom 24 has an opening to allow the power supply 20 to pass through.

For positioning each of the blocking means in translation and in rotation, these may be positioned at 90° From one another about the direction of translation of the sprayer 16.

As can be seen in FIG. 4, the groove or grooves 32 may be frustoconical, the width of the groove or grooves 32 decreasing toward the bottom of the sheath 22. This makes it possible to simplify the definition of the mold for the sheath 22; creating a draft angle in the walls of the mold for the sheath 22 facilitates demolding of the sheath 22. The frustoconical shape of the groove or grooves 32 is echoed in the guides 30; the guide surfaces 301 are not in the direction of translation of the sprayer 16 into the body 14 but inclined outward, in the direction of translation of the sprayer 16 toward the outside of the body 14.

The invention also relates to a detection system comprising the optical sensor 12 of a vehicle and the cleaning device 10, configured to clean the optical sensor 12. Thanks to the blocking of the body in the sheath, the body is held in place over time, despite vibration in the vehicle, and cleaning of the optical sensor by the sprayer is of good quality over time.

Figure 5:
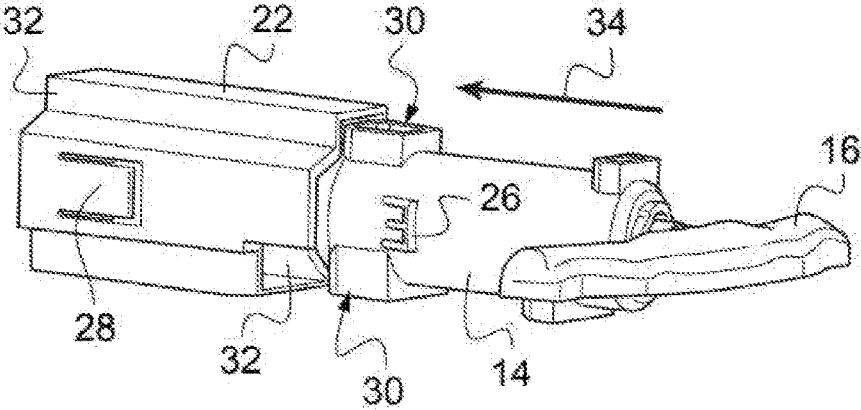
FIG. 5 is a perspective view of the assembly of the device of FIG. 1.

The invention also relates to a method for assembling the telescopic cleaning device 10. FIG. 5 is a perspective view of the assembly of the device of FIG. 1. The sprayer 16 is assembled with the body 14 and is adapted to be movable in translation relative to the body 14. The body 14 is inserted into the sheath 22 in translation in the direction of translation of the sprayer 16 toward the inside of the body 14. The arrow 34 in FIG. 5 shows the insertion of the body 14 into sheath 22. The body 14 is inserted into the sheath 22 via the end of the body 14 opposite that bearing the sprayer 16. The body 14 is attached in the sheath by the blocking means. Thus, during cleaning cycles in which the sprayer emerges from the body 14, the body 14 remains blocked in the sheath 22.

The body 14 to which the sprayer 16 is assembled may be inserted by translation into the sheath 22 even when the sheath 22 and the optical sensor 12 are in place in the vehicle. Advantage is taken of the space required for the movement of the sprayer 16 to insert the body 14 into the sheath 22. It is also possible to insert the body 14, to which the sprayer 16 is assembled, into the sheath 22 by translation, before attachment of the sheath 22 in the area surrounding the optical sensor 12.

During insertion of the body 14 into the sheath 22, the tabs 28 come up against the projections 26. Owing to their articulation to the rest of the sheath 22, the tabs 28 move apart elastically as the body 14 is inserted into the sheath 22. In the example of projections 26 in the form of inclined planes, the tabs 28 slide along the inclined planes. The body 14 is inserted into the sheath 22 until it comes into abutment against the bottom 24 of the sheath 22 and is held against the bottom 24 of the sheath 22 by the blocking means forming elastic nesting. The body 14 is then blocked in translation in the sheath. The power supply 20 extends through the bottom 24. The hooks at the end of the tabs 28 grip the projections 26 (for example the transverse walls of the inclined planes). The tabs 28 return to their stable position with the hooks engaged with the projections 26. The interaction between the tabs 28 and the projections 26 prevents the body 14 from coming out of the sheath, in particular upon movement of the sprayer 16 during cleaning cycles or owing to vibration in the vehicle.

The force of elastic nesting (or clipping force) of the tabs 28 on the projections 26 may be easily adjusted by increasing the height of the hooks on the tabs 28 and/or the projections 26.

When the body 14 is inserted into the sheath 22, the body 14 is guided in translation in the sheath 22 by the interaction of the guide surfaces 301 on one or the other of the body 14 or of the sheath 22 with at least the groove or grooves 32 on the other of the body 14 or of the sheath 22. The interaction of the guide surfaces 301 with the groove or grooves 32 forms the means for blocking the rotation of the sprayer body relative to the sheath. As per the figures, the surfaces 301 of the body 14 guide and facilitate the translation of the body 14 in the sheath through their interaction with the grooves 32 on the sheath 22. Furthermore, the interaction between the guide surfaces 301 and the groove or grooves 32 also serves as a poka-yoke for the correct positioning of the body 14 relative to the sheath 22. This ensures that the tabs 28 fully face the projections 26 and that the body is immobilized in the sheath 22.

The body 14 and the sheath 22 may be made using many types of plastic such as PC/ABS (Acrylonitrile Butadiene Styrene/Polycarbonate). This blend combines the high processability of ABS with the mechanical properties, impact and heat resistance of PC. It may also be polyoxymethylene (or polyformaldehyde or polyacetal), abbreviated to POM.

The present invention has been described in relation to specific embodiments, which have purely illustrative value and should not be considered limiting. In general, it will be obvious to a person skilled in the art that the present invention is not limited to the examples illustrated and/or described above. For example, the tabs 28 may be at the bottom of the grooves 32 and engage with the guides 30 to ensure blocking in translation of the body 14 relative to the sheath 22. The tabs 28 and projections 26 (or guides 30) may also block the body 14 relative to the sheath in translation, in the direction of translation of the sprayer both toward the outside and the inside of the body. More generally, the translation blocking means are constituted by any means generally perpendicular to the direction of translation of the sprayer relative to the body and the rotation blocking means are constituted by any means generally parallel to the direction of translation of the sprayer relative to the body.

What is claimed is:

1. A telescopic cleaning device for an optical sensor of a vehicle, comprising
    a support sheath,
    a sprayer body,
    a sprayer adapted to be movable in translation relative to
        the sprayer body, with
the sprayer body being adapted to be inserted in translation into the sheath and adapted to be attached in the sheath by a blocking means, the blocking means include tabs on the sprayer body or on the support sheath nesting elastically over and covering projections on the other of the sprayer body or of the support sheath and blocks translation of the sprayer body relative to the support sheath.

2. The cleaning device as claimed in claim 1, wherein the blocking means blocks rotation of the sprayer body relative to the sheath.

3. The cleaning device as claimed in claim 2, wherein the blocking means include guide surfaces on one or other of the sprayer body or of the support sheath interacting with at least one groove on the other of the sprayer body or of the support sheath.

4. The cleaning device as claimed in claim 3, wherein the at least one groove are frustoconical, the width of the at least one groove decreasing toward the bottom of the support sheath.

5. A detection system comprising an optical sensor of a vehicle and a telescopic cleaning device configured to clean the optical sensor, with the telescopic cleaning device including:
    a support sheath,
    a sprayer body,
    a sprayer adapted to be movable in translation relative to
        the sprayer body, with the sprayer body being adapted
        to be inserted in translation into the sheath and adapted
        to be attached in the sheath by a blocking means, the
        blocking means include tabs on the sprayer body or on
        the support sheath nesting elastically over and covering
        projections on the other of the sprayer body or of the
        support sheath and blocks translation of the sprayer
        body relative to the support sheath.

6. A method for assembling a telescopic cleaning device, comprising:
    inserting of a sprayer body into a sheath in a direction of
        translation of a sprayer toward the inside of the body,
    attaching the sprayer body in the sheath with a blocking
        means, the blocking means include tabs on the sprayer
        body or on the sheath nesting elastically over and
        covering projections on the other of the sprayer body or
        of the sheath and blocks translation of the sprayer body
        relative to the sheath.

7. The method as claimed in claim 6, wherein the blocking means blocks rotation of the sprayer body relative to the sheath, the blocking means including guide surfaces on one or other of the sprayer body or of the sheath interacting with at least one groove on the other of the sprayer body or of the sheath.

* * * * *